(12) United States Patent
Mitra et al.

(10) Patent No.: US 8,510,147 B2
(45) Date of Patent: Aug. 13, 2013

(54) SYSTEM AND METHOD FOR CALCULATING A COMPREHENSIVE PIPELINE INTEGRITY BUSINESS RISK SCORE

(75) Inventors: Dipayan Mitra, Bangalore (IN); Sandeep Kumar Dewangan, Bangalore (IN); Larry Joesph Rubenacker, Canton, MA (US); Manish Verma, New Delhi (IN); Prakash Dhake, Nashik (IN); Paras Sachdeva, New Delhi (IN)

(73) Assignee: Infosys Limited (IN)

( * ) Notice: Subject to any disclaimer, the term of this patent is extended or adjusted under 35 U.S.C. 154(b) by 520 days.

(21) Appl. No.: 12/699,384

(22) Filed: Feb. 3, 2010

(65) Prior Publication Data

US 2011/0137704 A1 Jun. 9, 2011

(30) Foreign Application Priority Data

Dec. 9, 2009 (IN) ............................ 3028/CHE/2009

(51) Int. Cl.
*G06Q 10/00* (2012.01)
(52) U.S. Cl.
USPC ............. 705/7.17; 705/7.41; 702/34; 702/51; 702/94; 702/25
(58) Field of Classification Search
None
See application file for complete search history.

(56) References Cited

U.S. PATENT DOCUMENTS

| | | | |
|---|---|---|---|
| 6,768,959 B2 | 7/2004 | Ignagni | |
| 6,813,949 B2 | 11/2004 | Masaniello et al. | |
| 6,912,502 B1 * | 6/2005 | Buddle et al. | 705/7.41 |
| 7,263,465 B2 | 8/2007 | Turley et al. | |
| 7,359,931 B2 | 4/2008 | Tarabzouni et al. | |
| 2002/0042700 A1 | 4/2002 | Giles | |
| 2004/0243321 A1 * | 12/2004 | Pittalwala et al. | 702/34 |
| 2006/0129338 A1 * | 6/2006 | Turley et al. | 702/51 |
| 2006/0259336 A1 * | 11/2006 | Anas et al. | 705/7 |
| 2007/0083398 A1 * | 4/2007 | Ivey et al. | 705/4 |
| 2008/0243917 A1 * | 10/2008 | Schneider et al. | 707/104.1 |
| 2010/0156630 A1 * | 6/2010 | Ainsbury | 340/540 |
| 2010/0185401 A1 * | 7/2010 | Hernandez et al. | 702/25 |
| 2010/0300184 A1 * | 12/2010 | Wayman et al. | 73/73 |
| 2010/0318395 A1 * | 12/2010 | Corneil et al. | 705/8 |

OTHER PUBLICATIONS

Timashev, Sviatoslav A. "Quantitative assessment of pipeline defects and risk-based maintenance optimization." Journal of Pipeline Integrity 1.2 (2002): 95-117.*

(Continued)

*Primary Examiner* — Jonathan G Sterrett
*Assistant Examiner* — Tzu-Hsiang Lan
(74) *Attorney, Agent, or Firm* — Cantor Colburn LLP

(57) ABSTRACT

A method and system for calculating pipeline integrity business risk score for a pipeline network is provided. The method includes a step of first calculating a structural risk score, an operational risk score and a commercial risk score for each pipeline segment in a pipeline network. The method further includes calculating pipeline integrity business risk score for each pipeline segment. The structural risk score, operational risk score, commercial risk score and pipeline integrity business risk score for each pipeline segment is rolled-up to calculate the respective risk scores of a pipeline network. The rolled-up risk scores are calculated by computing weight factors for each pipeline segment, relative risk scores weight of each pipeline segment and relative risk scores contribution of each pipeline segment. The system of the invention comprises executable files, dynamic linked libraries and risk score computing modules configured to display the risk scores using a dashboard.

26 Claims, 10 Drawing Sheets

(56) References Cited

OTHER PUBLICATIONS

Thorne, Martin. "Quantitative Pipeline Risk Assessment." Advantica Ltd Ashby Road Loughborough, Leicestershire, England, LE11 3GR, Phone 44.1509 (2005): 282340.*

DeWolf, Glenn B. "Process safety management in the pipeline industry: parallels and differences between the pipeline integrity management (IMP) rule of the Office of Pipeline Safety and the PSM/RMP approach for process facilities." Journal of hazardous materials 104.1 (2003): 169-192.*

Pitilakis, K., et al. "Vulnerability and Risk Assessment of Lifelines." Assessing and Managing Earthquake Risk. Springer Netherlands, 2006. 185-211.*

* cited by examiner

SYSTEM AND METHOD FOR CALCULATING A COMPREHENSIVE PIPELINE INTEGRITY BUSINESS RISK SCORE

FIELD OF INVENTION

The present invention relates generally to the field of pipeline integrity management. More particularly, the present invention provides for calculating a comprehensive pipeline integrity business risk score for a pipeline system.

BACKGROUND OF THE INVENTION

Pipeline integrity management (PIM) includes use of tools, technologies and strategies for ensuring integrity of pipeline assets and entities associated with operation and maintenance of oil and gas transmission and distribution pipelines. Entities associated with a pipeline include physical property, people and facilities in the vicinity of a pipeline. Since pipeline incidents pose a risk of causing significant damage to public property, human lives and environment, in addition to causing damage to pipeline assets, various regulations such as 49 CFR Parts 190 to 195 in the USA and Regulation 13A of the Pipelines Safety Regulations 1996 in the UK have been promulgated to enforce processes and procedures related to managing safe operations of a pipeline system.

Regulations such as Transmission Integrity Management Program (TIMP), Liquid Integrity Management Program (LIMP) and Distribution Integrity Management Program (DIMP), require oil and gas pipeline operators to address threats to pipeline integrity from internal and external sources, manage the risks and build organizational capabilities to mitigate or eliminate the probability and effects of all risks. Current practices in pipeline integrity management adopt an approach of conducting periodic pipeline integrity assessments. Based on results of pipeline integrity assessments, specific corrective actions such as repairs, rerating, decommissioning and replacement of parent pipeline, coating, measuring instruments, changes in procedures, skill enhancement of pipeline engineers and technicians are undertaken. However, the periodicity of pipeline integrity assessment varies with the practices of pipeline operators, often extending from one year to several years and the implementations of the recommendations undertaken are considered valid until the next assessment event. Additionally, the approach of conducting periodic pipeline integrity assessments assumes that the status & changes in the structural and operational conditions of the pipeline segments & equipments are within the acceptable tolerance limits and any deviations during the period between the previous assessment and the next remain unaccounted. Further, current risk assessment practices focus on the assessment of structural integrity of the pipeline system. Operational factors such as a pipeline operator's operational maturity & readiness to predict, prevent and respond to an impending failure threat is not accounted for significantly in the assessment. Such factors are integral to assuring pipeline integrity to stakeholders. Similarly, commercial implications of potential failures are also not taken into account in current risk assessment practices.

Based on the above limitations, there is need for a method and system for comprehensively calculating pipeline risk score, which can reflect the extent of risk to the pipeline operator's business due to pipeline integrity.

SUMMARY OF THE INVENTION

A method and system for calculating a pipeline integrity business risk score is provided. The method includes detecting a change in value of one or more data sources. In an embodiment, the data sources comprise data related to the pipeline segment recorded through one or more sources. The method further includes reading parameter values from databases. In an embodiment, the parameter values are stored in the databases by manual inputs and by automated inputs. Thereafter, a structural risk score, an operational risk score and a commercial risk score for each pipeline segment is calculated. Using the values of structural risk score, operational risk score and commercial risk score a pipeline integrity business risk score for each pipeline segment is calculated.

In various embodiments of the present invention, a rolled-up structural risk score, operational risk score, commercial risk score and pipeline integrity business risk score for the pipeline network is calculated. Based on the rolled-up risk scores, a user interface is updated and used to render one or more graphical representations related to the pipeline integrity business risk.

In various embodiments of the present invention, rolled-up structural risk score, operational risk score, commercial risk score and pipeline integrity business risk score for the pipeline network is calculated by creating pipeline segments in the pipeline network based on logical grouping of pipeline characteristics. Further, a structural risk score value, an operational risk score value, a commercial risk score value and a pipeline integrity business risk score value is assigned to each pipeline segment. Thereafter, data regarding each pipeline segment is fetched. The data includes length of pipeline segment and capacity of pipeline segment. Subsequently, weight factor of each pipeline segment is computed based on length and capacity of pipeline segment and then relative risk scores weight of each pipeline segment is computed. Afterwards, relative risk scores contribution of each pipeline segment is computed and then structural risk score, operational risk score, commercial risk score and pipeline integrity business risk score of the pipeline network is computed based on the relative risk scores contribution of each pipeline segment.]

In various embodiments of the present invention, the system for calculating pipeline integrity business risk score includes a first executable file configured to execute binary instructions for fetching structural risk score, operational risk score and commercial risk score from respective executable files. The system further includes a set of dynamic linked libraries configured to process exchange of instructions, data and handshake between the first executable file and executable files corresponding to structural risk score, operational risk score and commercial risk score. For calculating pipeline integrity business risk score, the system includes a risk score computing module configured to invoke the first executable file in order to perform the calculation.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
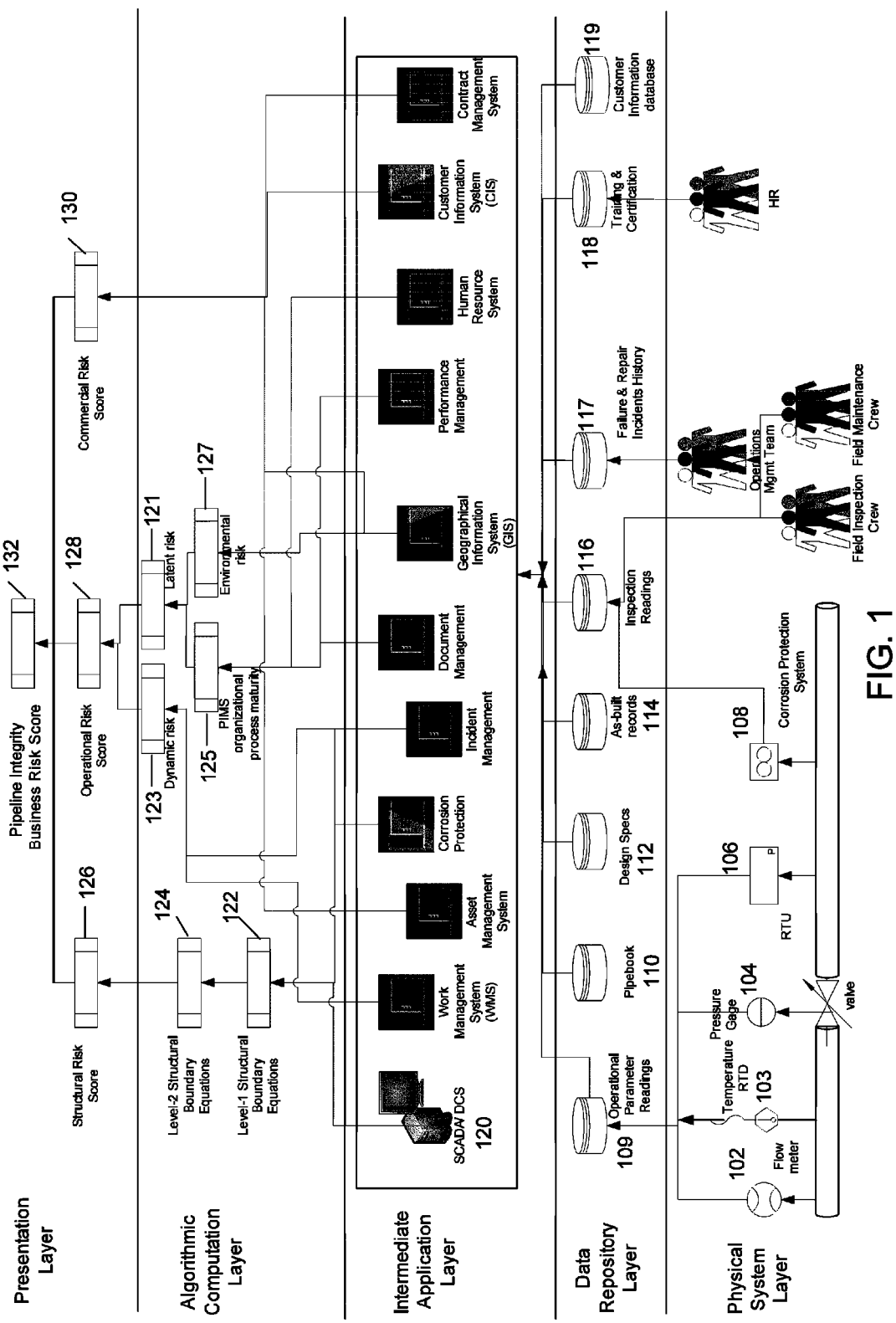
FIG. 1 illustrates an architectural diagram for pipeline integrity ecosystem, showing source and usage of the data for calculating relative risk scores of a oil and gas pipeline system, leading to the calculation of pipeline integrity business risk score.

FIG. 1 illustrates an architectural diagram for pipeline integrity ecosystem, showing source and usage of the data for calculating relative risk scores of a oil and gas pipeline system, leading to the calculation of pipeline integrity business risk score; The architecture comprises the following layers: physical system layer, data repository layer, intermediate application layer, algorithmic computation layer and presentation layer. The physical system layer comprises physical equipment installed at various locations along the pipeline. The installed physical system facilitates measurement and gathering of data for assessing pipeline integrity. As shown in the figure, the physical system layer comprises field devices such as a flow meter 102, a Resistance Temperature Detector [RTD] 103, a pressure gauge 104, a Remote Terminal Unit (RTU) 106 and a corrosion protection system 108. The flow meter 102 is an instrument for measuring flow of gas through a pipeline whereas the pressure gauge 104 is used for measuring pressure of gas flowing through the pipeline. The corrosion protection system 108 comprises accessories and devices used for corrosion protection of a pipeline. The accessories and devices used include, but are not limited to, epoxy coatings, heat-shrinkable sleeves, corrosion protection tapes, related equipment and instruments of impressed current corrosion protection system, sacrificial anodes for galvanic protection system etc. In an embodiment of the present invention, based on evaluations performed on data obtained from corrosion measurement and protection devices at different levels of assessment, certain parameters can be calculated that facilitate the calculation of pipeline integrity risks. The data measured using the flow meter 102, the RTD 103 and the pressure gauge 104 is then provided to a Remote Terminal Unit (RTU) 106. The RTU is a microprocessor controlled data gathering unit that collates automated data from field devices and then transfers the data to a central location using real time communication systems. In an embodiment of the present invention, the data is transferred to a Supervisory Control and Data Acquisition (SCADA) system. In another embodiment of the present invention, field data is acquired manually. In case of manual data acquisition, data such as pipe to soil potential and weight of anodes, both being part of corrosion protection system 108, are obtained by field inspection crews and logged in the Inspection Reading module 116.

In various embodiments of the present invention, the data repository layer is responsible for data acquisition from components of the physical system layer and other miscellaneous sources. Additionally, the data repository layer is also responsible for data storage. As shown in the figure, the operational parameter readings component 109 in the data repository layer receives operational parameters measured by components of the physical system layer. The data repository layer includes databases such as, Pipe Book 110, Design Specs 112, As-built records 114, Inspection Readings 116 and Failure and repair incidents history 117. The Inspection Readings module 116 is configured to receive and store data from field inspection crew and field maintenance crew. Further, the Failure and Repair incidents history 117 is gathered from the operations management team. The Pipe Book 110 contains data that includes construction details, location of each pipe segment of the pipeline network such as pipe number, mill number, weld number and chainage (distance of a point in the pipeline from a reference point in the pipeline system or network). The Design Specs 112 contains data related to the design specification of the pipeline such as design pressure, hydrostatic test pressure, material specifications, dimension details etc. The As-built records 114 contain data on pipeline alignment route, location of each component of the pipeline system, installation date, isometric drawings etc. The Inspection readings 116 contain historical data about the damages such as pitting corrosion, dents, gouges, metal loss, thickness and their locations. The Failure and repair history 117 database contains data on number of incidents, date and location of incidents, cause-and-effect analysis, fatalities, damages to property etc. The Training and Certification database 118 comprises data on the competency levels of personnel, operating, maintaining and managing the pipeline system, such as skills, certifications, activity to skill matrix, activity to certification matrix, validity of certifications etc. The customer information database 119 comprises data on the number of customers by type and location, sale and purchase contract details, including details such as firm sale volumes, price, penalties etc.

In an embodiment of the present invention, the intermediate application layer comprises a SCADA/DCS system 120. The SCADA is a system that monitors and receives data from elements of a pipeline system and then provides data to higher layers such as, algorithmic computation layer and presentation layer. In an exemplary embodiment, the SCADA system comprises signal hardware, controller, user interfaces, communications equipment and software. As shown in the figure, the SCADA system receives data registered by physical system layer devices such as the flow meter 102, the Temperature RTD 103, the pressure gauge 104. The data is received through the RTU 106 and is stored in the Operational Parameter readings database 109. Additionally, data on corrosion is acquired through field inspection surveys and stored in the Inspection readings database 116. The intermediate application layer comprises additional components that are used for providing data to algorithmic computation layer and presentation layer for calculating pipeline integrity risk scores. The additional components are Contract Management System (CMS), Customer Information System (CIS), Corrosion protection system, Incident management system, Human Resource System (HRS), Pipeline integrity Performance Management System, Geographical Information System (GIS), Document Management System, Asset Management System and Work Management System.

The algorithmic computation layer comprises modules implementing equations for calculating Structural risk score 126. Further, the layer includes factors used in the calculation of Operational risk score 128 and the Commercial risk score 130. As shown in the figure, the modules Level-1 structural boundary equations 122 and Level-2 structural boundary equations 124 implement equations for calculating structural risk score. Level-1 structural boundary equations are equations that are used to determine probability of occurrence of an incident, for each component type, that conforms to Level-1 acceptance condition. Level-2 structural boundary equations are equations that are used to determine probability of occurrence of an incident, for each component type, that conforms to Level-2 acceptance condition.

Factors used in the calculation of the Operational risk score 128 includes two components: Latent operational risk score 121 and Dynamic operational risk score 123. The Latent risk score 121 is computed using Pipeline Integrity Management System (PIMS) organizational maturity risk score 125 and Environmental risk score 127. The PIMS organizational maturity risk score is calculated using the organizational maturity stages of an excellence matrix, which comprises dimensions of an organizational system that determine its capabilities of predicting, preventing, mitigating and responding to risks on a pipeline system and its environment. The Environmental risk score 127 is computed using three factors i.e. Human risk level, Property risk level and Environment regulation risk level. The Dynamic risk score 123 is computed based on manual inputs on event based threats such as force majeure events (floods, hurricane etc.) or automated inputs on manual activity induced threats such as excavation near a pipeline. The automated input is received when a work order is created in the Work Management System. The Dynamic risk score 123 is considered in the computation process until the status of the threat is active or open.

The Commercial Risk score 130 is computed using inputs from the Customer Information system (CIS), Contract Management System, Geographical information system (GIS) and Asset Management System.

The highest layer of abstraction in the architecture for pipeline integrity business risk score calculation is the presentation layer. The calculation for structural risk score 126, operational risk score 128 and commercial risk score 130 is done by acquiring data from components of lower level layers. Finally, as shown in the figure, the Pipeline Integrity Business Risk Score 132 is calculated using the Structural risk score 126, the Operational risk score 128 and the Commercial risk score 130

Figure 2:
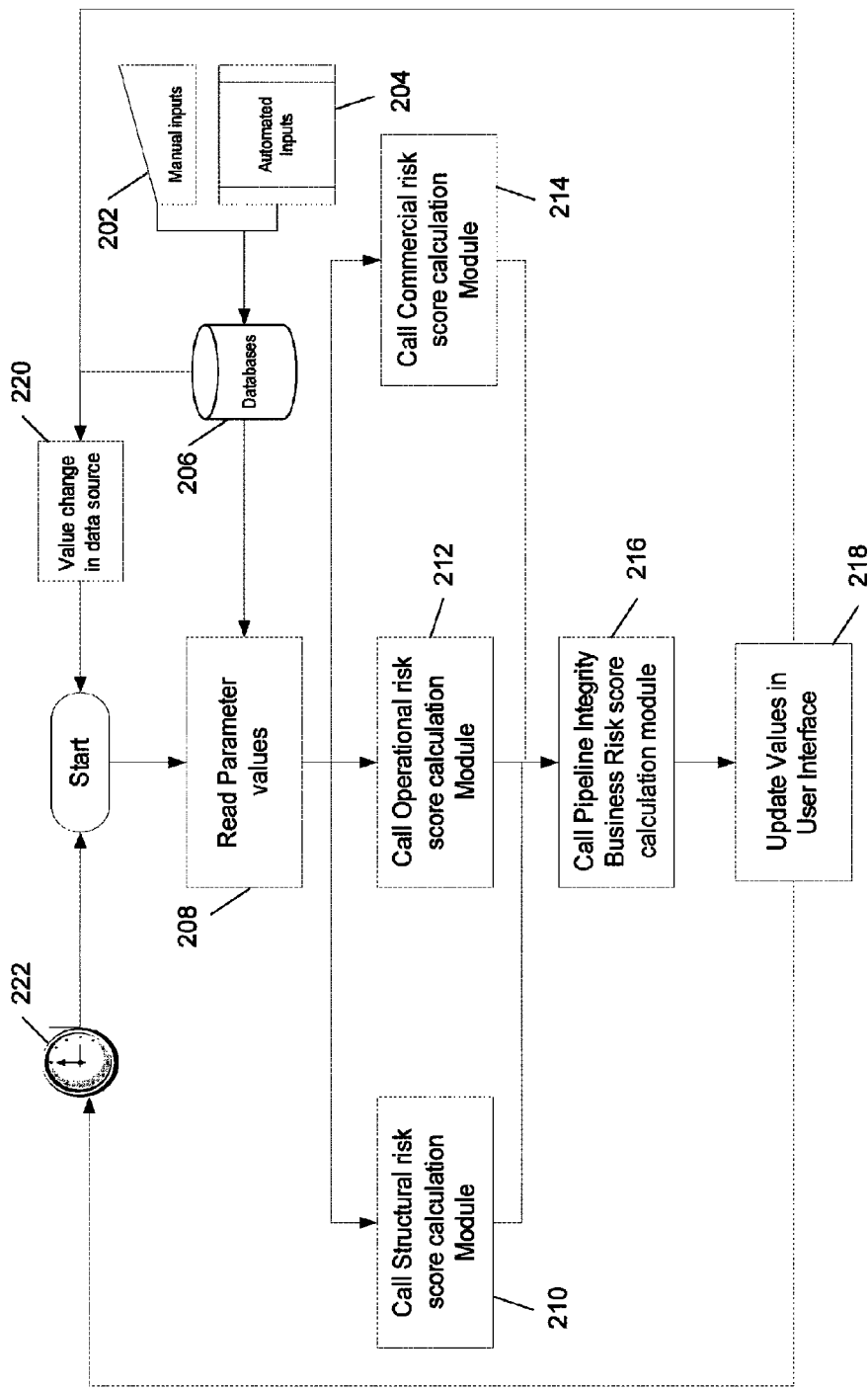
FIG. 2 illustrates a sequence of activities performed for every instance of calculation of the risk scores, leading to the calculation of pipeline integrity business risk score.

FIG. 2 illustrates a sequence of activities performed for every instance of calculation of the risk scores, leading to the calculation of pipeline integrity business risk score. At step 202, manual inputs are provided related to parameter calculation and at step 204 automated inputs are provided related to parameter calculation. The risk score algorithm is triggered when there is a change of value at a data source 220 or at a predefined time interval 222. The data corresponding to manual inputs and automated inputs are stored in databases 206. At step 208, parameter values are read. Thereafter, corresponding to steps 210, 212 and 214, structural risk score, operational risk score and commercial risk score are calculated. Finally, the pipeline integrity business risk score calculation module is called at step 216. Thereafter, values in user interface are updated at step 218.

Figure 3:
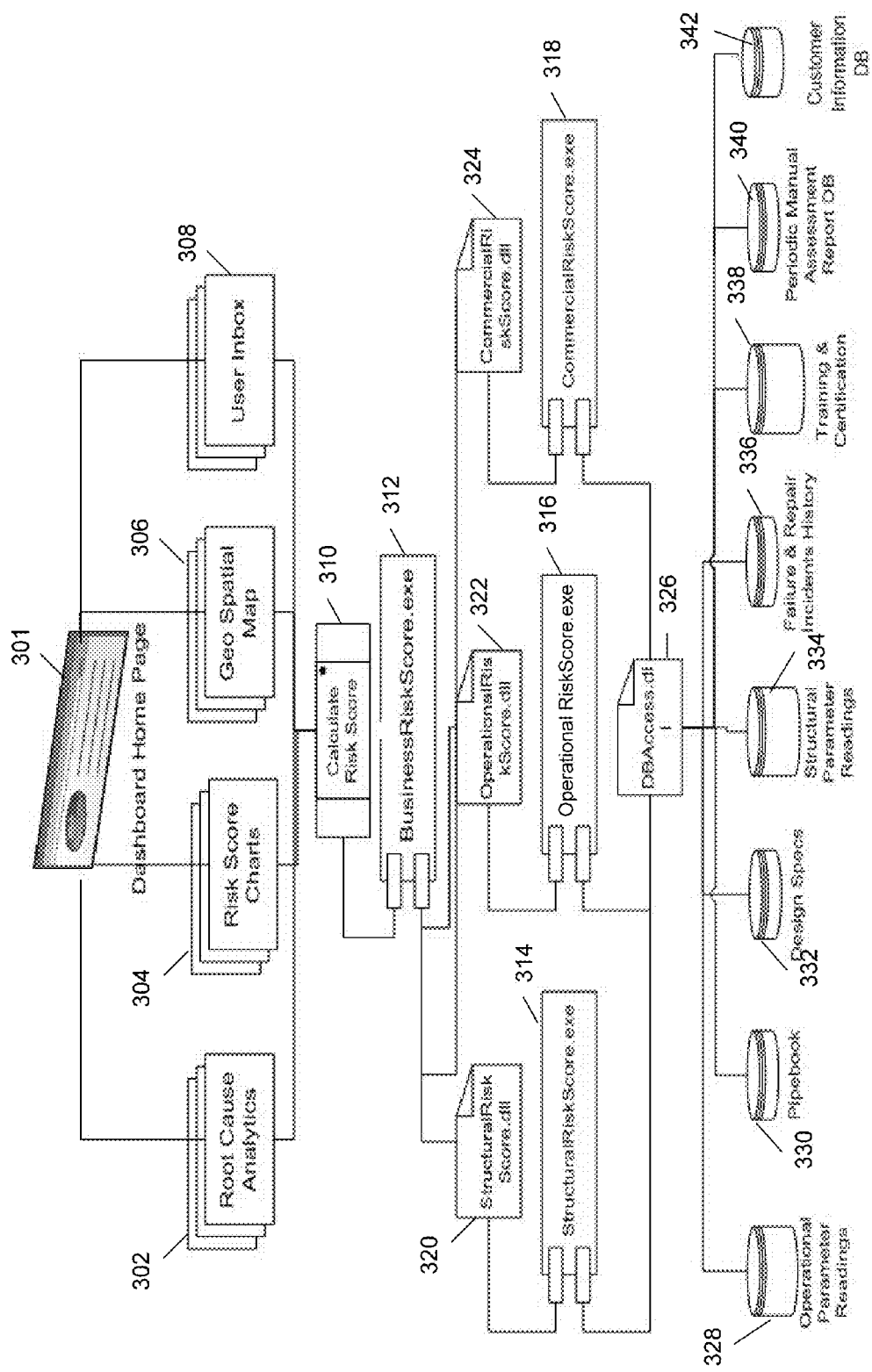
FIG. 3 depicts illustration of various components of the software application built and linked to execute calculation of pipeline integrity business risk score.

FIG. 3 depicts illustration of various components of the software application built and linked to execute calculation of pipeline integrity business risk score. In an embodiment of the present invention, the components of the software application include a user interface module, calling procedures, executable files, dynamic link libraries and databases. As shown in the figure, a user interface module 301 comprises a root cause analytics module 302, a risk score charts module 304, a geo spatial map 306 and user inbox 308. The computation of pipeline integrity business risk score and information update on user interface modules are executed by the Calculate Risk Score module 310. In various embodiments of the present invention, one or more modules in the form of executable files are used in the computation of pipeline integrity business risk score. The Calculate Risk Score module 310 is invoked either when there is a change of value at a data source or at a predefined time interval. The Calculate Risk Score module 310 in turn calls Business Risk Score module 312. Business Risk Score module 312 includes binary instructions for fetching Structural risk score from Structural Risk Score module 314, Operational risk score from Operational Risk Score module 316, and Commercial risk score from Commercial Risk Score module 318. The exchange of instructions, data and handshake between the Business Risk Score module 312, and the Structural Risk Score module 314, Operational Risk Score module 316 and Commercial Risk Score module 318 respectively is handled by specifically written dynamic link libraries StructuralRiskScore.dll 320, OperationalRiskScore.dll 322 and CommercialRiskScore.dll 324. When invoked, the executable files StructuralRiskScore.exe 314, OperationalRiskScore.exe 316 and CommercialRiskScore.exe 318 fetch values of parameters, required for respective computation, from respective databases through DBAccess.dll 326 dynamic link library. DBAccess.dll 326 is a dynamic link library acts as a parser of instructions, data and handshake between the calling executable file and the target database. In various embodiments of the present invention, the business risk score is calculated using the following components: Operational Parameter Readings 328, Pipebook 330, Design Specs 332, Structural Parameter Readings 334, Failure and Repair Incidents history 336, Training & Certification 338 and Periodic Manual Assessment database 340 and Customer Information database 342.

Figure 4:
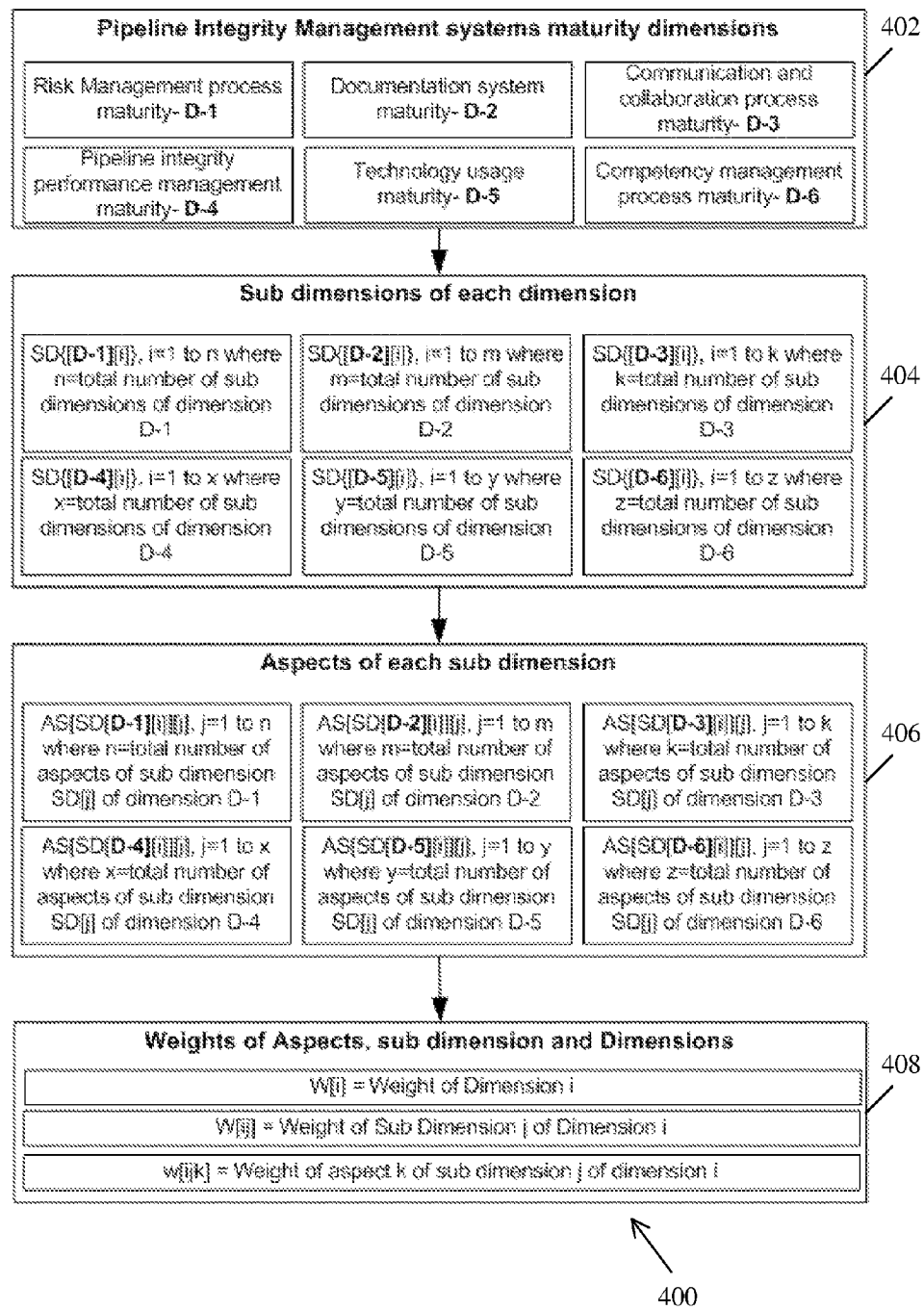
FIG. 4 illustrates a data structure for capturing the scores and for computing the pipeline integrity management system maturity based on organizational maturity stages of excellence.

FIG. 4 illustrates data structure 400 for capturing the scores and the computing the pipeline integrity management system maturity based on organizational maturity stages of excellence. In various embodiments of the present invention, the data structure 400 comprises Pipeline integrity management systems maturity dimensions 402, sub-dimensions of each dimension 404, aspects of each sub-dimension 406 and weights of aspects, dimensions and sub-dimensions 408. The dimensions at 402 include Risk management process maturity (D1), Documentation system maturity (D2), Communication and collaboration process maturity (D3), Pipeline Integrity Performance management process maturity (D4), Technology usage maturity (D5) and Competency management process maturity (D6), each of which reflects an organizational capability, related to pipeline integrity management, to predict, prevent, mitigate and respond to threats to a pipeline system and its environment. Each Dimension has several Sub-Dimensions 404, which comprise the organizational capabilities within a dimension. Each Sub Dimension 404 lists a set of Aspects 406, which are a set of questions for exploring the specific organizational capabilities of each Sub Dimension. Every Dimension 402, Sub-Dimension 404 and Aspect 406 has a weight factor 408, which is used to compute the weighted average risk score of each Sub-Dimension 404, rolled up to each Dimension and further rolled up to define the pipeline integrity management systems maturity risk score. The pipeline integrity management systems (PIMS) maturity is assessed and a maturity level is assigned by the assessor for each Aspect 406 based on organizational maturity stages of excellence framework. The risk score for the corresponding maturity level is assigned automatically. The risk score for each aspect is then used to compute the Sub-Dimension level risk score by averaging the scores on weighted basis. Using the same method, the risk scores for each Dimension and the organization is computed on a roll-up basis to compute the PIMS risk score.

Figure 5:
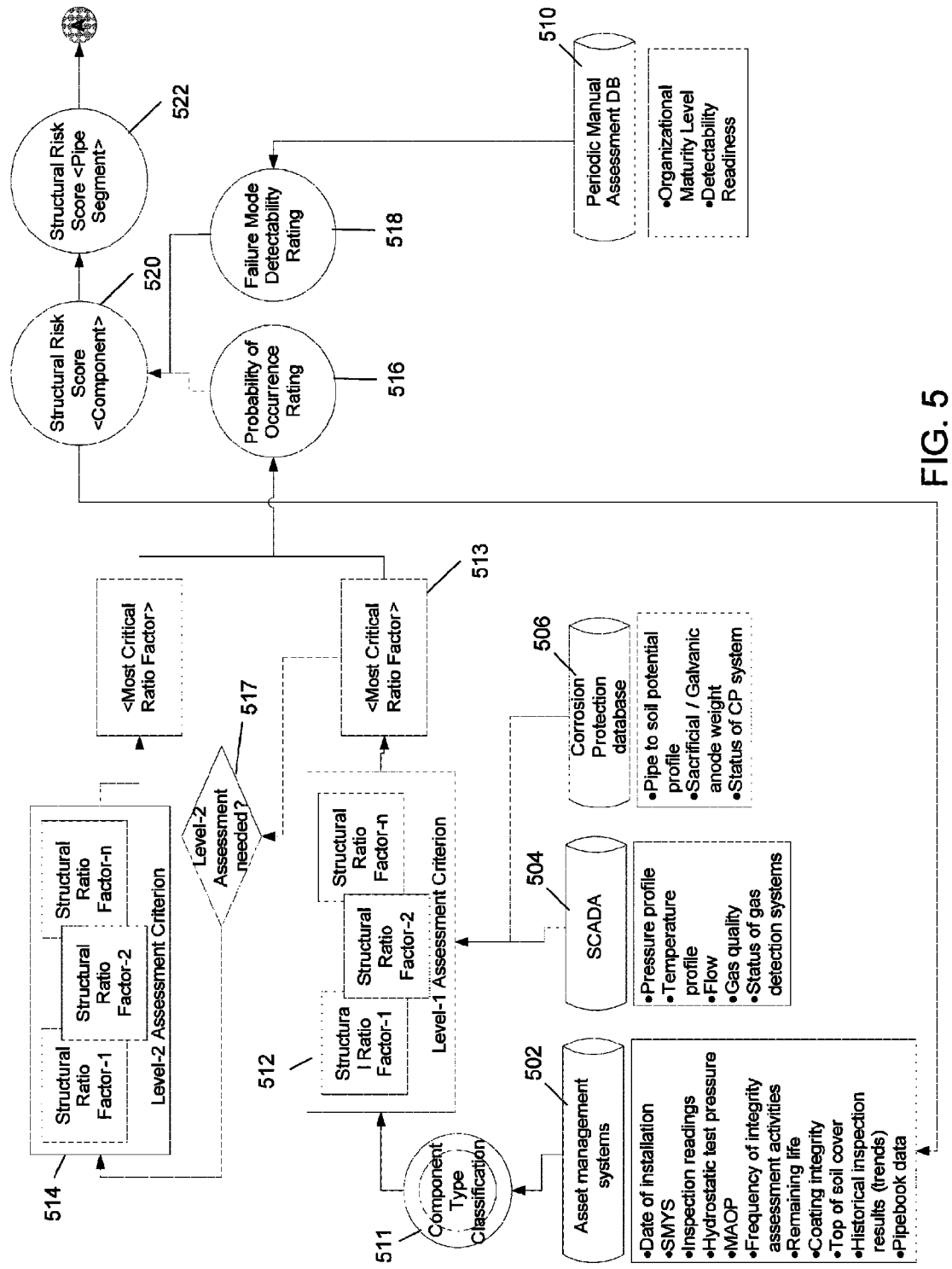
FIG. 5 illustrates data flow diagram for structural risk score computation for pipeline segment, in accordance with an embodiment of the present invention.

FIG. 5 illustrates data flow diagram 500 for structural risk score computation for a pipeline segment, in accordance with an embodiment of the present invention. The data flow diagram 500 comprises input modules such as asset management systems 502, SCADA 504, and corrosion protection database 506. The inputs from the asset management systems 502, SCADA 504, and corrosion protection database 506 are provided to the component type classification module 511. The component type classification module 511 identifies the type of component of the pipeline segment under consideration for structural risk score computation. In an exemplary embodiment of this invention, the component type would mean one of the class viz. (i) cylindrical and conical shells, and elbows, (ii) spherical shells and formed heads, (iii) atmospheric and low pressure storage tanks, (iv) pressure vessel component OR (v) piping component. Component type classification is used to select the appropriate engineering calculation equation for structural risk score computation at Level-1 assessment criteria module 512 and Level-2 assessment criteria module 514. The Level-1 assessment criteria module 512 uses the parameter values from asset management system 502, SCADA 504 and corrosion protection database 506. The exemplary parameters such as thickness readings, corrosion rate readings, temperature and pressure envelope and specified design and operational boundary conditions for each component viz. maximum allowed operating pressure, future corrosion allowance, SMYS etc are used in engineering equations to derive a structural ratio factor. Structural ratio factor is an indicator of the closeness of the measured or computed structural strength to the allowable boundary condition of structural strength for safe operations under current operating conditions. Structural ratio factor can be computed by multiple and alternate assessment approaches and their respective engineering formulae as practiced and prescribed by applicable standards such as API579-1. In an exemplary embodiment of the present invention multiple assessment approaches are applied using parameters such as average measured thickness, minimum measured thickness and an added criteria on critical thickness profile, point thickness reading etc. A structural ratio factor is computed for each of the applicable assessment approaches for the said component. The structural ratio factor closest to the boundary condition is selected as the most critical ratio factor 513. A component is subject to Level-2 assessment only when the calculated structural condition fails to meet the Level-1 acceptance criteria. The most critical structural ratio factor is used for computing the probability of occurrence rating 516. The Probability of occurrence rating 516 is computed through a transfer function which takes the most critical ratio factor as input and gives the output within a defined range of values.

As shown in the figure, using output from the Periodic Manual assessment database 510, a failure mode detectability rating 518 is calculated. The detectability rating 518 is fetched from a lookup table, which is derived from a detectability assessment exercise of the pipeline system. The assessment results will record the mapping of the level of detectability for a combination of a component type and a failure mode parameter. Finally, using probability of occurrence rating 516 and failure mode detectability rating 518 for the failure mode parameter corresponding to the most critical ratio factor, a structural risk score is calculated for a component at step 520. Thereafter, structural risk score for a pipe segment is calculated at step 522.

Figure 6:
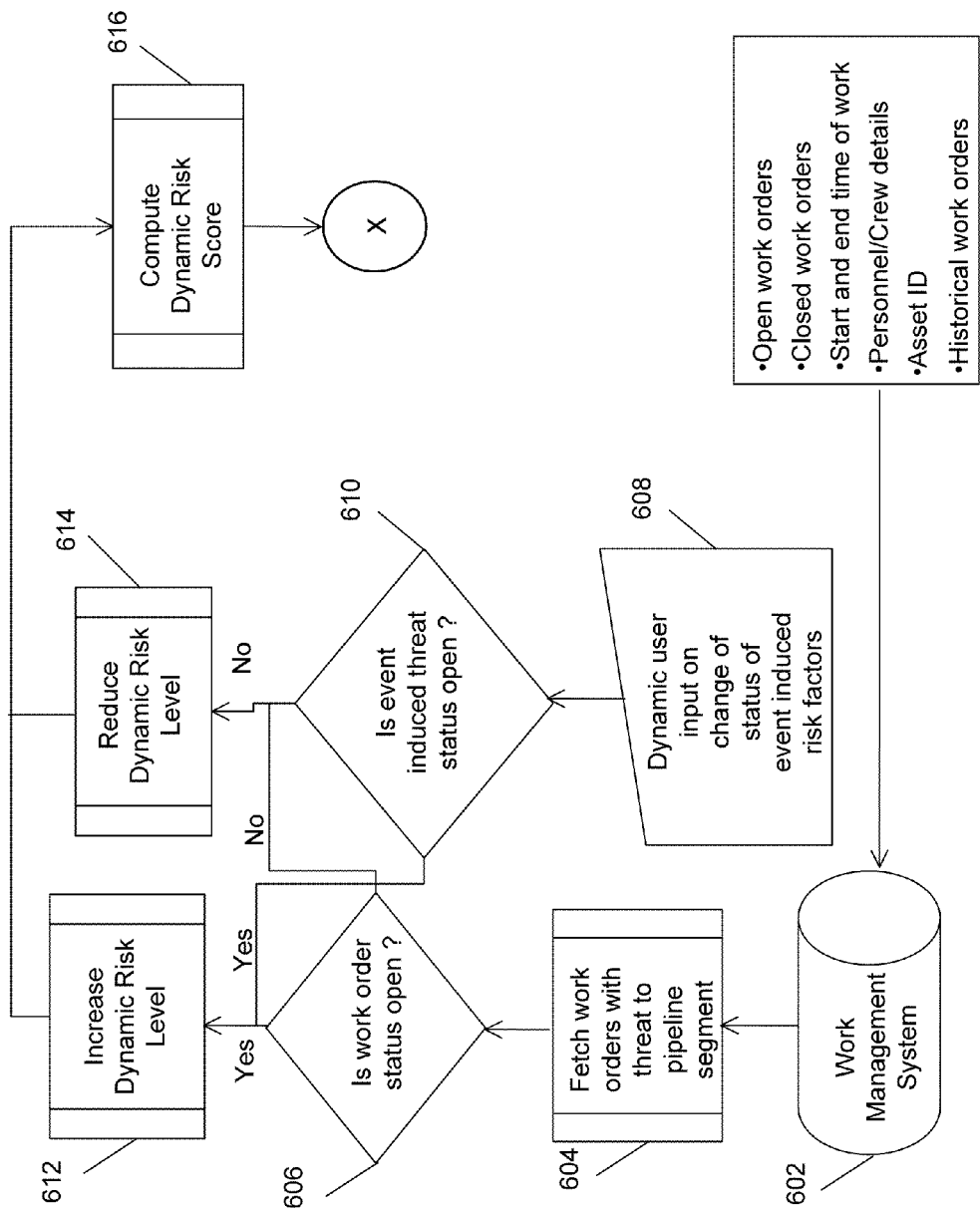
FIGS. 6 and 7 illustrate computation of operational risk score for pipeline segment, in accordance with an embodiment of the present invention.
Figure 7:
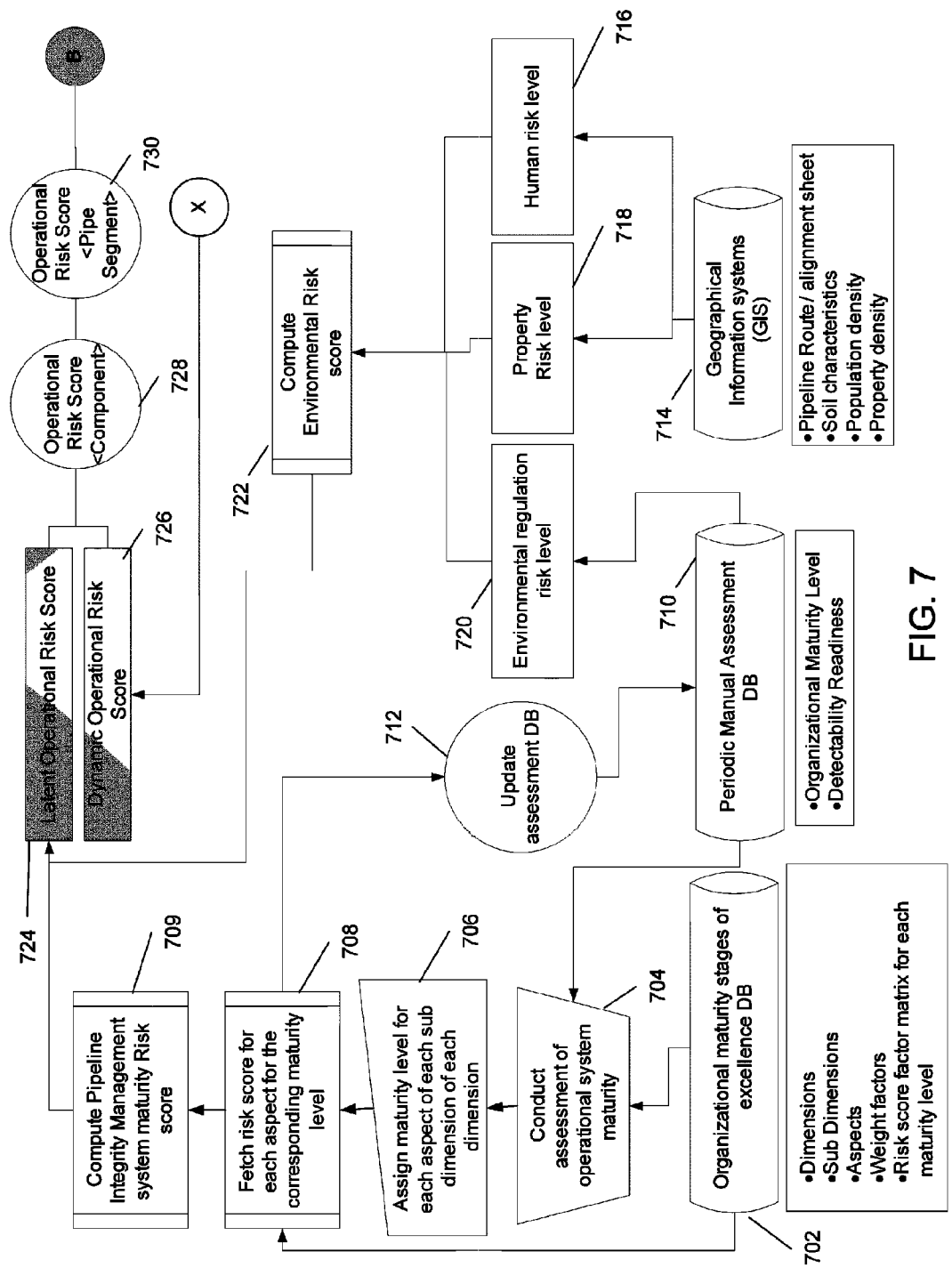

FIGS. 6 and 7 illustrate calculation of operational risk score for pipeline segment, in accordance with an embodiment of the present invention. The Operational Risk score is a combination of two scores: Latent Risk score and Dynamic Risk Score. Dynamic risk is caused by a threat factor, which does not prevail under normal circumstances but causes risk to the pipeline system during the period when the threat begins until the threat ceases to exist. Such threats are generally either Manual Activity induced such as a scheduled or unplanned excavation activity on or near a pipeline system or Event induced such as hurricane or floods, which are not in the complete control of the pipeline operator. As shown in FIG. 6, data from Work Management System 602 includes open work orders, closed work orders, start and end time of work, Personnel/crew details, asset identifier and historical work orders. At step 604, work orders for the above mentioned activities that are a threat to a pipeline segment are fetched from the work management system. Thereafter, at step 606, it is determined whether work order status is open. If it is determined that work order status is open, then at step 612 dynamic risk level is increased. However, if at step 606, it is determined that work order status is closed, at step 614, dynamic risk level is reduced.

In another embodiment of the present invention, dynamic user input on change of status of event induced risk factors is provided at step 608. Thereafter, at step 610 it is determined whether event induced threat status is open. Finally, dynamic risk score is computed at step 616, which is a combination of activity induced risk and event induced risk.

At step 702, organizational maturity stages of excellence are determined. In an exemplary embodiment, the organizational maturity stages of excellence include dimensions, sub-dimensions, aspects and weight factors. Thereafter, at step 704, assessment of operational system maturity is determined. Inputs from periodic manual assessment database 710 are provided to conduct assessment of operational system maturity. Thereafter, at step 706, new maturity level is assigned to each aspect. At step 708, the corresponding risk score of the new maturity level is fetched for each aspect and the periodic manual assessment database 710 is updated at step 712. The risk score is used to calculate PIMS maturity risk score at step 709. The geographical information system module 714 includes pipeline route/alignment sheets, soil characteristics, property density and population density etc. Information from the geographical information systems 714 is used to determine human risk level 716 and property risk level 718, The environmental regulation risk level 720 is assigned during the periodic manual assessment based on the assessment of the applicable environmental regulations on the pipeline system in that location. The environmental risk score is computed at step 722 using the risk scores corresponding to human risk level 716, property risk level 718 and environmental risk level 720. Thereafter, latent operational risk score is calculated at step 724. The Operational risk score for a component 728 is computed using the latent operational risk score 724 and the dynamic operational risk score 726. Thereafter, structural risk score for a pipeline segment 730 is computed.

Figure 8:
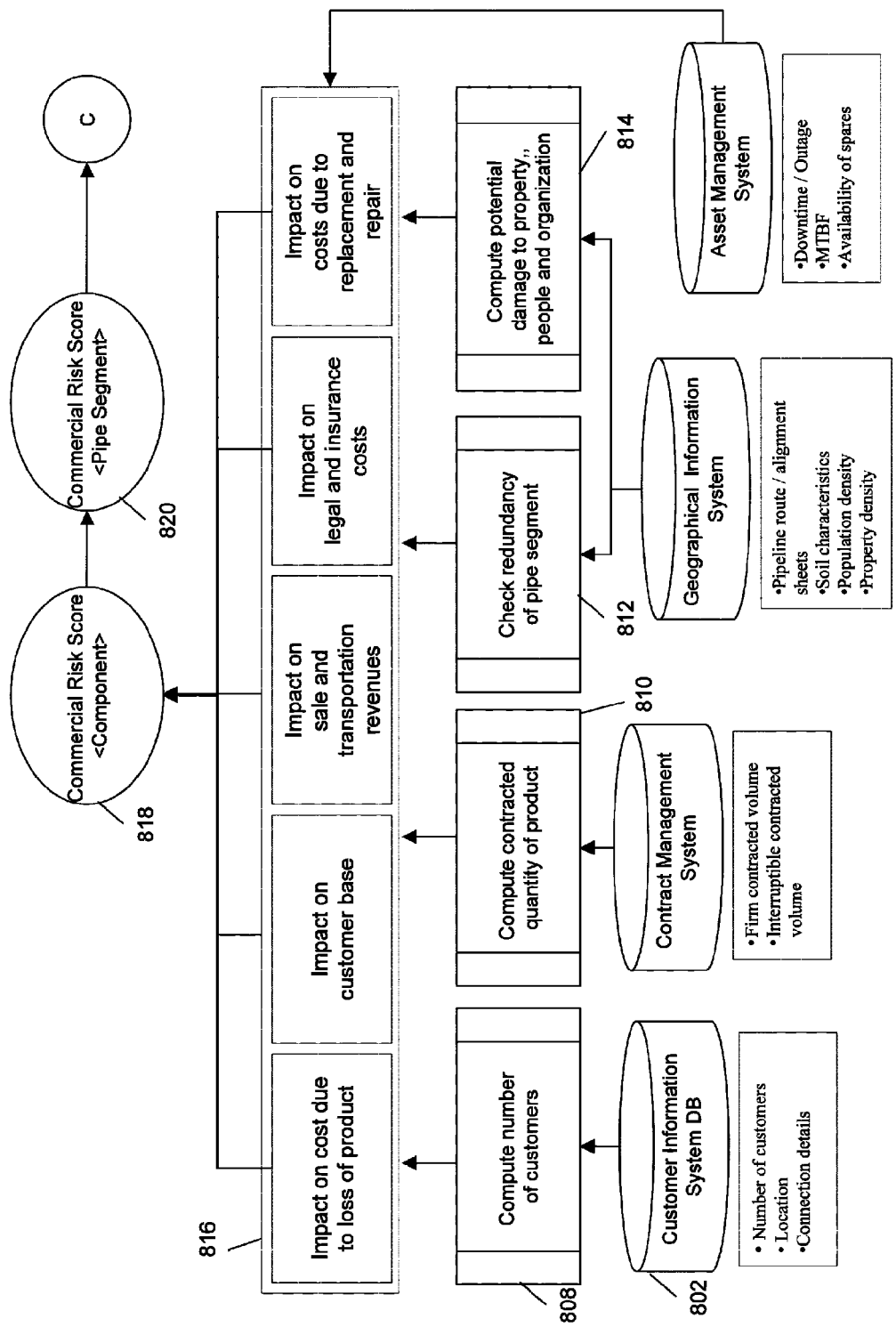
FIG. 8 illustrates a data flow diagram for commercial risk score computation for pipeline segment, in accordance with an embodiment of the present invention.

FIG. 8 illustrates a data flow diagram for commercial risk score computation for a pipeline segment, in accordance with an embodiment of the present invention. As shown in the diagram, for calculating commercial risk score for pipeline segment, data is obtained from the following systems: Customer Information System (CIS) database 802, Geographical Information System (GIS) 804 and Asset Management Systems 806. The CIS database 802 includes the following information: Number of customers, location, firm contracted volume and connection details. The GIS system 804 includes the following information: Pipeline route/alignment details, soil characteristics, population density and property density. Based on the information provided by the CIS database 802, the number of customers is computed at step 808 and the contracted quantity of product is computed at step 810. Similarly, based on the inputs provided by the GIS system 804, redundancy of pipe segment is checked at step 812 and potential damage to property, people and organization is computed at step 814. Information from the asset management system 806 includes Downtime/outage time, Mean Time Between Failures (MTBF) and availability of spares. Based on the above inputs, the following costs are calculated at step 816: impact on cost due to loss of product, impact on customer base, impact on sale and transportation revenues, impact on legal and insurance costs and impact on costs due to replacement and repair. Finally, commercial risk score for a component is calculated at step 818 and commercial risk score for a pipe segment is calculated at step 820.

Figure 9:
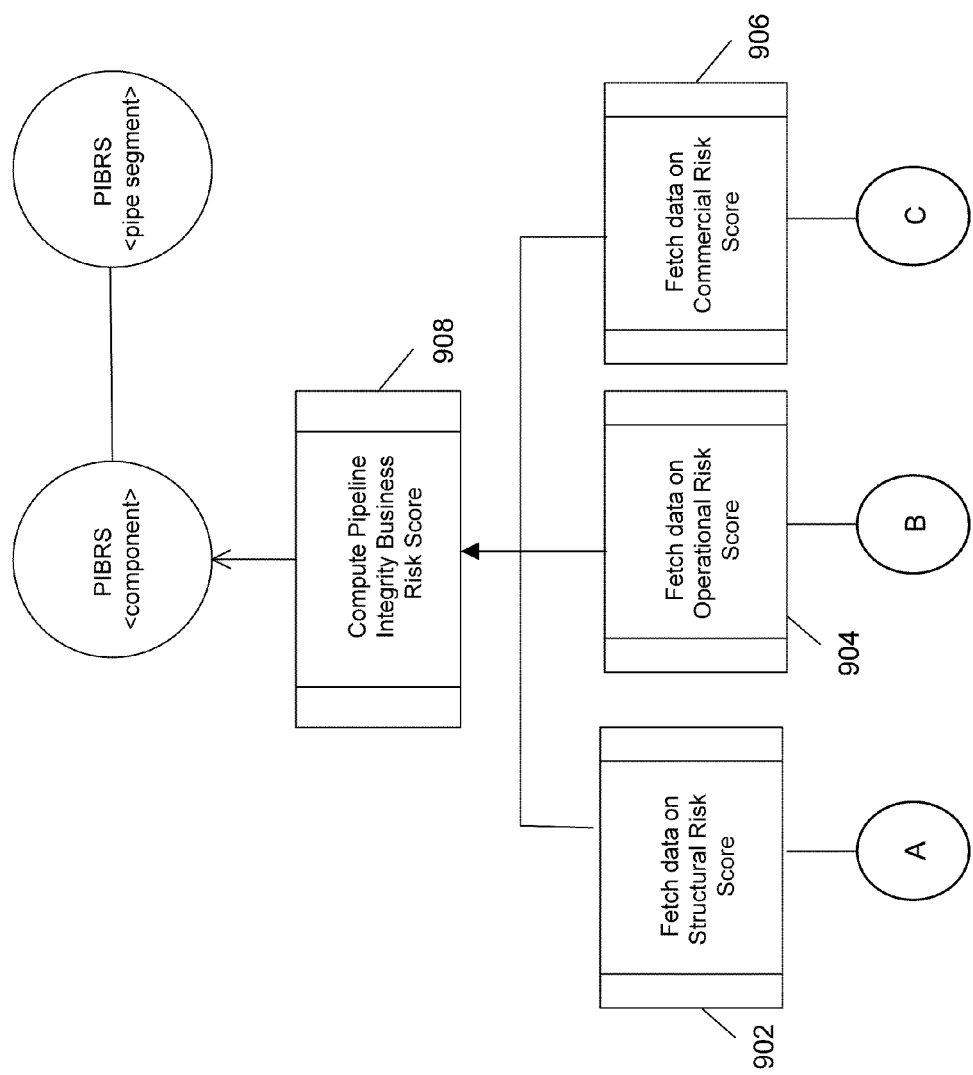
FIG. 9 illustrates a data flow diagram for pipeline integrity business risk score computation, in accordance with an embodiment of the present invention.

FIG. 9 illustrates a data flow diagram for pipeline integrity business risk score computation, in accordance with an embodiment of the present invention. Referring to FIGS. 5, 6, 7 and 8 based on the computation of structural risk score, operational risk score and commercial risk score, data on structural risk score for a pipeline segment is fetched at step 902. Similarly, data on operational risk score and commercial risk score for a pipeline segment is fetched respectively at steps 904 and 906. In an embodiment, the structural, operational and commercial risk scores for a specific pipeline segment is fetched from respective modules.

Thereafter, pipeline integrity business risk score is computed at step 908. In an embodiment of the present invention, the pipeline integrity business risk score is calculated by the equation:

$$\text{Business Risk Score}_{Segment} = \\ \text{Structural Risk Score}_{segment} \times \text{Operational Risk Score}_{segment} \times \\ \text{Commercial Risk Score}_{segment} \times \text{Normalization factor}$$

The Normalization factor is used to calibrate the business risk score in a defined range of values for ease and uniformity of interpretation by the users and display on the user interface.

Figure 10:
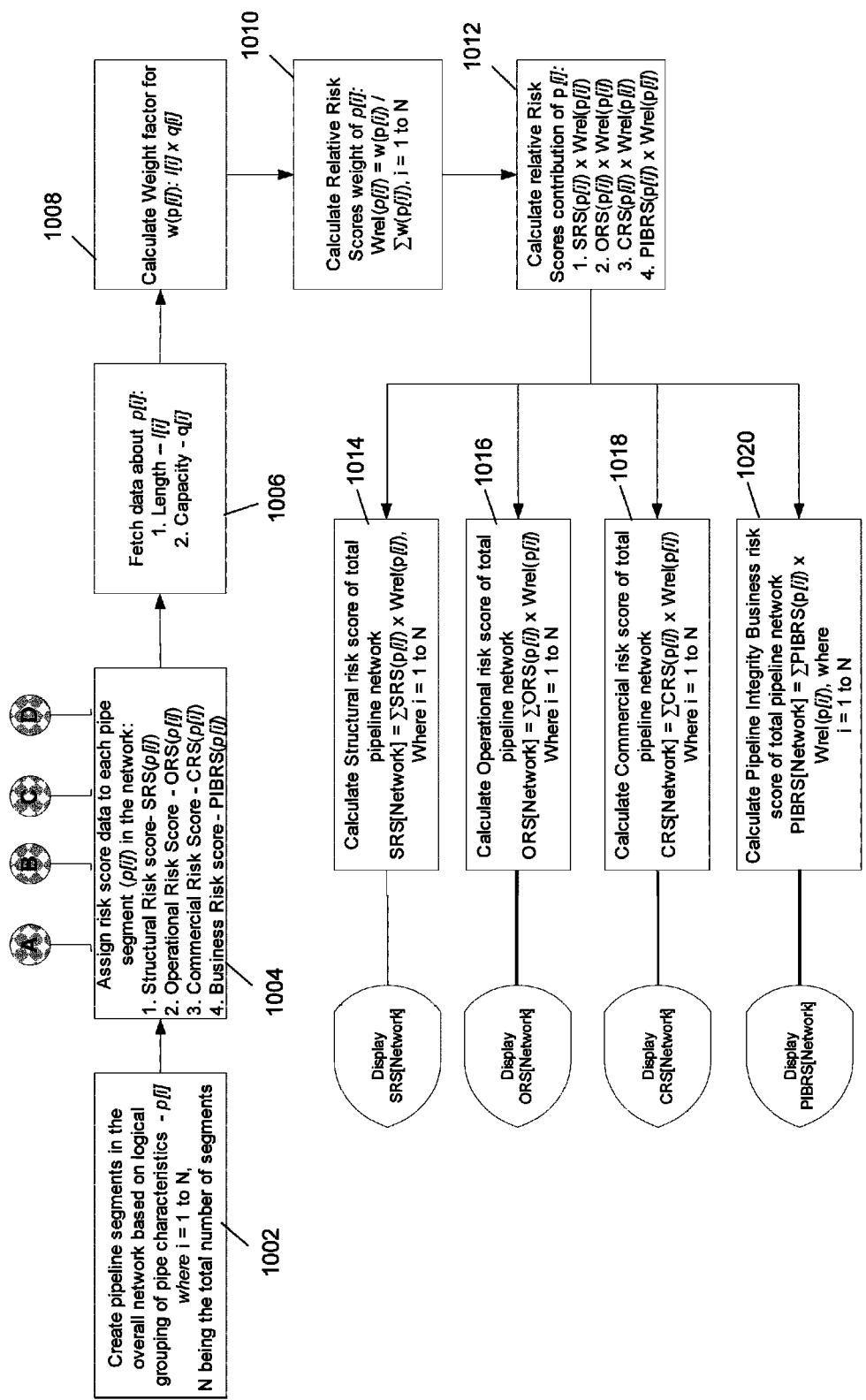
FIG. 10 illustrates a risk score rollup method for a pipeline network, in accordance with an embodiment of the present invention.

FIG. 10 illustrates a risk score rollup method for a pipeline network, in accordance with an embodiment of the present invention. As shown in the figure, at step 1002, pipeline segments are created in the overall network. In an embodiment of the present invention, the pipeline segments are created based on logical grouping of pipe characteristics. At step 1004, based on the calculation of structural risk score, operational risk score and commercial risk score, risk score data is assigned to each pipe segment in the network. Thereafter, relevant data is fetched about the pipeline segment at step 1006 and weight factor for each pipeline segment is calculated at step 1008. In an exemplary embodiment of the present invention, the weight factor is a product of the length and capacity of the pipeline segment. At step 1010, relative risk scores weight for each pipeline segment in the pipeline network is calculated and at step 1012 relative risk scores contribution for each pipeline segment is calculated.

Finally, at steps 1014, 1016, 1018 and 1020, structural risk score, operational risk score, commercial risk score and pipeline integrity business risk score of total pipeline network is calculated and is displayed at a graphical user interface.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for calculating pipeline integrity business risk score for a pipeline segment and a pipeline network comprising one or more pipeline segments, the method comprising the steps of:

detecting a change in value of one or more data sources, wherein the data sources comprise data related to the pipeline segment recorded through one or more sources;

reading parameter values from data storage units storing databases, wherein the parameter values are received over a computer network and stored in the databases by manual inputs and by automated inputs;

receiving, by one or more calculation modules, the parameter values;

calculating, by the one or more calculation modules, a structural risk score for each pipeline segment, the structural risk score being calculated based on a probability of structural failure;

calculating, by the one or more calculation modules, an operational risk score for each pipeline segment, the operational risk score representing a pipeline operator's ability to respond to a potential structural failure;

calculating, by the one or more calculation modules, a commercial risk score for each pipeline segment, the commercial risk score representing commercial consequences arising from potential structural failure;

calculating, by the one or more calculation modules, a pipeline integrity business risk score for each pipeline segment, wherein the pipeline integrity business risk score is a combination of the structural risk score, the operational risk score and the commercial risk score;

calculating rolled-up structural risk score, operational risk score, commercial risk score and pipeline integrity business risk score for the pipeline network; and updating and rendering one or more values on a user interface, wherein the user interface is configured to display one or more graphical representations related to the pipeline integrity business risk, wherein the structural risk score represents probability of occurrence of failure modes objectively, and calculating the structural risk score comprises the steps of:

identifying for structural risk score computation, a component type corresponding to a component under assessment within the pipeline segment;

measuring a plurality of pipeline parameters corresponding to the component under assessment;

deriving a plurality of structural ratio factors, each structural ratio factor corresponding to one of the measured plurality of pipeline parameters, wherein each structural ratio factor comprises a value representing a difference between (1) measured value of the corresponding pipeline parameter and (2) a boundary condition prescribed for safe operations in connection with the corresponding pipeline parameter;

selecting a most critical ratio factor from among the plurality of structural ratio factors, wherein selection of the most critical ratio factor is based on comparing values of the plurality of structural ratio factors and identifying a structural ratio factor having a smallest difference between (1) measured value of the corresponding pipeline parameter and (2) the boundary condition prescribed for safe operations in connection with the corresponding pipeline parameter; and computing the probability of occurrence based on the most critical factor ratio and a transfer function.

2. The method of claim 1, wherein the parameter values are read from databases after predetermined time intervals.

3. The method of claim 1, wherein the automated inputs comprise operational parameter readings from field devices comprising at least one of a flow meter, a resistance temperature detector and a corrosion protection system, further wherein the data is provided to a SCADA system through a remote terminal unit.

4. The method of claim 1, wherein the automated inputs comprise data from at least one of pipe book, design specs, as-built records, inspection readings and failure, repair incidents history, training and certification records and customer information.

5. The method of claim 1, wherein calculating the structural risk score further comprises calculating the probability of occurrence of failure modes using measured parameters from inspection, operations and maintenance of pipeline systems and by comparing with first level structural boundary conditions and second level structural boundary conditions.

6. The method of claim 1, wherein calculating a structural risk score comprises deriving failure mode detectability rating for the critical structural ratio factor from a reference table, comprising detectability ratings for combinations of component types and failure mode parameters.

7. The method of claim 6, wherein structural risk score is computed based on the values of probability of occurrence and detectability of failure mode.

8. The method of claim 1, wherein calculating an operational risk score comprises calculating a latent operational risk score and a dynamic operational risk score.

9. The method of claim 8, wherein the latent risk score comprises a PIMS organizational maturity risk score and an environmental risk score.

10. The method of claim 9, wherein the PIMS risk score is calculated using organizational maturity stages of an excellence matrix, further wherein the excellence matrix comprises dimensions of organizational system related to the pipeline system that determines its capabilities of predicting, preventing, mitigating and responding to risks on the pipeline system and its environment.

11. The method of claim 10, wherein the dimensions comprises Risk management process maturity dimension, Documentation system maturity dimension, Communication and collaboration process maturity dimension, Pipeline Integrity Performance management process maturity dimension, Technology usage maturity dimension and Competency management process maturity dimension.

12. The method of claim 11, wherein each dimension comprises a plurality of sub-dimensions, wherein each sub-dimension comprises organizational capabilities within a dimension.

13. The method of claim 12, wherein each sub-dimension comprises a set of aspects, wherein the set of aspects are a set of questions for exploring specific organizational capabilities of each Sub Dimension.

14. The method of claim 13, wherein the PIMS maturity risk score is calculated by computing a weighted average risk score of each Sub-Dimension rolled up to each dimension, further wherein the weighted average risk score of each Sub-Dimension is calculated using weight factors of each aspect within the sub-dimension.

15. The method of claim 9, wherein the environmental risk score is calculated based on human risk level, property risk level and environmental regulation risk level.

16. The method of claim 8, wherein the dynamic risk score is computed based on manual inputs on event based threats.

17. The method of claim 8, wherein the dynamic risk score is computed based on automated inputs from systems using data comprising at least one of open work orders, closed work orders, start and end time of work, Personnel/crew details, and asset identifier identifiers.

18. The method of claim 17, wherein dynamic risk level is increased if data obtained from manual inputs or automated inputs indicate active or open status for the threat.

19. The method of claim 17, wherein dynamic risk level is decreased if data obtained from manual inputs or automated inputs indicate inactive or closed status for the threat.

20. The method of claim 1, wherein the commercial risk score is computed based on factors comprising at least one of impact on cost, impact on revenue and impact on customer base due to incidents that may cause outage of services, loss of commodity, damage to life and property, and violation of regulatory requirements.

21. The method of claim 20, wherein the impact on cost is computed based on factors including at least one of loss of product or commodity, MTBF, insurance costs, litigations costs, and costs incurred on replacement and repair of pipeline system components.

22. The method of claim 20, wherein the impact on revenue is computed based on factors including at least one of opportunity loss on sale of commodity and transmission capacity due to system outage, MTBF, and redundancy of alternate supply routes in the pipeline network, firm and interruptible contracted volumes, contracted price of commodity, and transmission tariff.

23. The method of claim 20, wherein the impact on customer base is computed based on factors including at least one of a number of customers affected, percentage of customer churn, and availability of alternative pipeline operators service providers.

24. The method of claim 1, wherein the pipeline integrity business risk score for a pipeline segment is computed based on structural risk score, operational risk score and commercial risk score of the pipeline segment.

25. The method of claim 1, wherein the step of calculating rolled-up structural risk score, operational risk score, commercial risk score and pipeline integrity business risk score for the pipeline network comprises:

creating pipeline segments in the pipeline network based on logical grouping of pipeline characteristics;

assigning a structural risk score value, an operational risk score value, a commercial risk score value and a pipeline integrity business risk score value to each pipeline segment;

fetching data regarding each pipeline segment, wherein the data comprises at least one of length of pipeline segment and capacity of pipeline segment;

computing weight factor for each pipeline segment based on length and capacity of pipeline segment;

computing relative risk scores weight of each pipeline segment;

computing relative risk scores contribution of each pipeline segment, wherein the relative risk scores contribution of a pipeline segment is calculated based on a risk score value and a relative risk score weight value of the pipeline segment; and computing structural risk score, operational risk score, commercial risk score and pipeline integrity business risk score of the pipeline network.

26. A non-transitory computer usable medium having a computer readable program code embodied therein for parallel query processing, the computer readable program code comprising instructions for performing a method comprising:

detecting a change in value of one or more data sources, wherein the data sources comprise data related to the pipeline segment recorded through one or more sources;

reading parameter values from a database, wherein the parameter values are stored in the database by manual inputs and by automated inputs;

calculating a structural risk score for each pipeline segment, wherein structural risk score is calculated based on probability of structural failure;

calculating an operational risk score for each pipeline segment, wherein operational risk score represents a pipeline operator's ability to respond to potential structural failure;

calculating a commercial risk score for each pipeline segment, wherein commercial risk score represents commercial consequences arising from potential structural failure;

calculating pipeline integrity business risk score for each pipeline segment, wherein the pipeline integrity business risk score is a combination of the structural risk score, the operational risk score and the commercial risk score;

calculating rolled-up structural risk score, operational risk score, commercial risk score and pipeline integrity business risk score for the pipeline network; and updating and rendering one or more values on a user interface, wherein the user interface is configured to display one or more graphical representations related to the pipeline integrity business risk, wherein the structural risk score represents probability of occurrence of failure modes objectively, and calculating the structural risk score comprises the steps of:

identifying for structural risk score computation, a component type corresponding to a component under assessment within the pipeline segment;

measuring a plurality of pipeline parameters corresponding to the component under assessment;

deriving a plurality of structural ratio factors, each structural ratio factor corresponding to one of the measured plurality of pipeline parameters, wherein each structural ratio factor comprises a value representing a difference between (1) measured value of the corresponding pipeline parameter and (2) a boundary condition prescribed for safe operations in connection with the corresponding pipeline parameter;

selecting a most critical ratio factor from among the plurality of structural ratio factors, wherein selection of the most critical ratio factor is based on comparing values of the plurality of structural ratio factors and identifying a structural ratio factor having a smallest difference between (1) measured value of the corresponding pipeline parameter and (2) the boundary condition prescribed for safe operations in connection with the corresponding pipeline parameter; and computing the probability of occurrence based on the most critical factor ratio and a transfer function.

* * * * *